United States Patent
Yi

(10) Patent No.: US 10,568,103 B2
(45) Date of Patent: Feb. 18, 2020

(54) METHOD AND APPARATUS FOR COMMUNICATING WITH A NETWORK ON CELLULAR INTERNET-OF-THINGS CARRIERS

(71) Applicant: LG ELECTRONICS INC., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 15/573,898

(22) PCT Filed: Jun. 13, 2016

(86) PCT No.: PCT/KR2016/006257
§ 371 (c)(1),
(2) Date: Nov. 14, 2017

(87) PCT Pub. No.: WO2016/200238
PCT Pub. Date: Dec. 15, 2016

(65) Prior Publication Data
US 2018/0295612 A1    Oct. 11, 2018

Related U.S. Application Data

(60) Provisional application No. 62/174,492, filed on Jun. 11, 2015.

(51) Int. Cl.
*H04W 72/04* (2009.01)
*H04W 4/38* (2018.01)
(Continued)

(52) U.S. Cl.
CPC ........ *H04W 72/048* (2013.01); *H04B 1/7156* (2013.01); *H04B 7/26* (2013.01);
(Continued)

(58) Field of Classification Search
CPC ... H04W 72/048; H04W 4/38; H04W 64/006; H04W 72/042; H04W 52/0216;
(Continued)

(56) References Cited

U.S. PATENT DOCUMENTS

2013/0182680 A1    7/2013    Choi et al.
2014/0241261 A1    8/2014    Ratasuk et al.
(Continued)

FOREIGN PATENT DOCUMENTS

WO    2014000174    1/2014

OTHER PUBLICATIONS

U.S. Appl. No. 62/132,461. PUCCH Management for Enhanced Carrier Aggregation. filed Mar. 12, 2015 [retrieved on Jun. 7, 2019]. Retreived from: USPTO DAV. pp. 1-34.*
(Continued)

*Primary Examiner* — Omar J Ghowrwal
(74) *Attorney, Agent, or Firm* — Dentons US LLP

(57) ABSTRACT

A method and apparatus for configuring cellular internet-of-things (CIoT) is provided. For one embodiment, a method for communicating on a CIoT carrier in a wireless communication system is provided. A user equipment (UE) receives a configuration of a reference carrier and the CIoT carrier, performs synchronization on the reference carrier, and communicates with a network on the CIoT carrier.

3 Claims, 13 Drawing Sheets

(51) Int. Cl.

| | | |
|---|---|---|
| *H04B 1/7156* | (2011.01) | |
| *H04W 64/00* | (2009.01) | |
| *H04W 52/02* | (2009.01) | |
| *H04W 74/08* | (2009.01) | |
| *H04W 4/70* | (2018.01) | |
| *H04L 5/00* | (2006.01) | |
| *H04B 7/26* | (2006.01) | |
| *H04W 76/28* | (2018.01) | |
| *H04W 74/00* | (2009.01) | |

(52) U.S. Cl.
CPC .......... *H04L 5/0048* (2013.01); *H04L 5/0053* (2013.01); *H04L 5/0092* (2013.01); *H04W 4/38* (2018.02); *H04W 4/70* (2018.02); *H04W 52/0216* (2013.01); *H04W 64/006* (2013.01); *H04W 72/042* (2013.01); *H04W 74/0833* (2013.01); *H04B 2001/71563* (2013.01); *H04W 72/0453* (2013.01); *H04W 74/004* (2013.01); *H04W 76/28* (2018.02); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/24* (2018.01)

(58) Field of Classification Search
CPC ... H04W 74/0833; H04W 4/70; H04W 76/28; H04W 72/0453; H04W 74/004; H04B 1/7156; H04B 2001/71563; H04B 7/26; Y02D 70/1262; Y02D 70/1242; Y02D 70/1224; Y02D 70/142; Y02D 70/146; H04L 5/0048; H04L 5/0053; H04L 5/0092

See application file for complete search history.

(56) References Cited

U.S. PATENT DOCUMENTS

| | | |
|---|---|---|
| 2014/0247781 A1 | 9/2014 | Somasundaram et al. |
| 2015/0024744 A1 | 1/2015 | Yi et al. |
| 2015/0382294 A1* | 12/2015 | Schliwa-Bertling ........................ H04W 52/0229 370/311 |
| 2016/0105863 A1* | 4/2016 | Li ............................ H04J 11/00 370/330 |
| 2016/0198471 A1* | 7/2016 | Young ............... H04W 72/1273 370/329 |
| 2016/0270063 A1* | 9/2016 | Chen ........................ H04L 5/00 |

OTHER PUBLICATIONS

U.S. Appl. No. 62/017,133. Improved Downlink Monitoring in Extended Coverage. filed Jun. 25, 2014 [retrieved on Jun. 7, 2019]. Retrieved from: USPTO DAV. pp. 1-7.*

* cited by examiner

METHOD AND APPARATUS FOR COMMUNICATING WITH A NETWORK ON CELLULAR INTERNET-OF-THINGS CARRIERS

CROSS-REFERENCE TO RELATED APPLICATIONS

This application is the National Stage filing under 35 U.S.C. 371 of International Application No. PCT/KR2016/006257, filed on Jun. 13, 2016, which claims the benefit of U.S. Provisional Application No. 62/174,492 filed on Jun. 11, 2015, the contents of which are all hereby incorporated by reference herein in their entirety.

BACKGROUND OF THE INVENTION

Field of the Invention

The present invention relates to wireless communications, and more particularly, to a method and apparatus for configuring cellular internet-of-things (CIoT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Machine-to-machine (M2M) communication represents a significant growth opportunity for the 3GPP ecosystem. To support the so called "Internet-of-things" (IoT), 3GPP operators have to address usage scenarios with devices that are power efficient (with battery life of several years), can be reached in challenging coverage conditions, e.g. indoor and basements and, more importantly, are cheap enough so that they can be deployed on a mass scale and even be disposable.

Cellular IoT (CIoT) devices may require very low throughput, may not have stringent delay requirements like those required for real time services, may not need to support circuit switched services, may not need to support inter-radio access technology (RAT) mobility and may perform intra-RAT mobility by cell reselection. For CIoT, some additional features may be required.

SUMMARY OF THE INVENTION

The present invention provides a method and apparatus for configuring cellular internet-of-things (CIoT) in a wireless communication system. The present invention discusses mechanisms for CIoT system.

In an aspect, a method for communicating, by a user equipment (UE), on a cellular internet-of-things (CIoT) carrier in a wireless communication system is provided. The method includes receiving a configuration of a reference carrier and the CIoT carrier, performing synchronization on the reference carrier, and communicating with a network on the CIoT carrier.

In another aspect, a method for transmitting, by a user equipment (UE), a physical random access channel (PRACH) for cellular internet-of-things (CIoT) in a wireless communication system is provided. The method includes detecting change of coverage class, and transmitting the PRACH with information on the coverage class to a network.

Various aspects for CIoT can be enhanced.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi™), IEEE 802.16 (WiMAX™), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
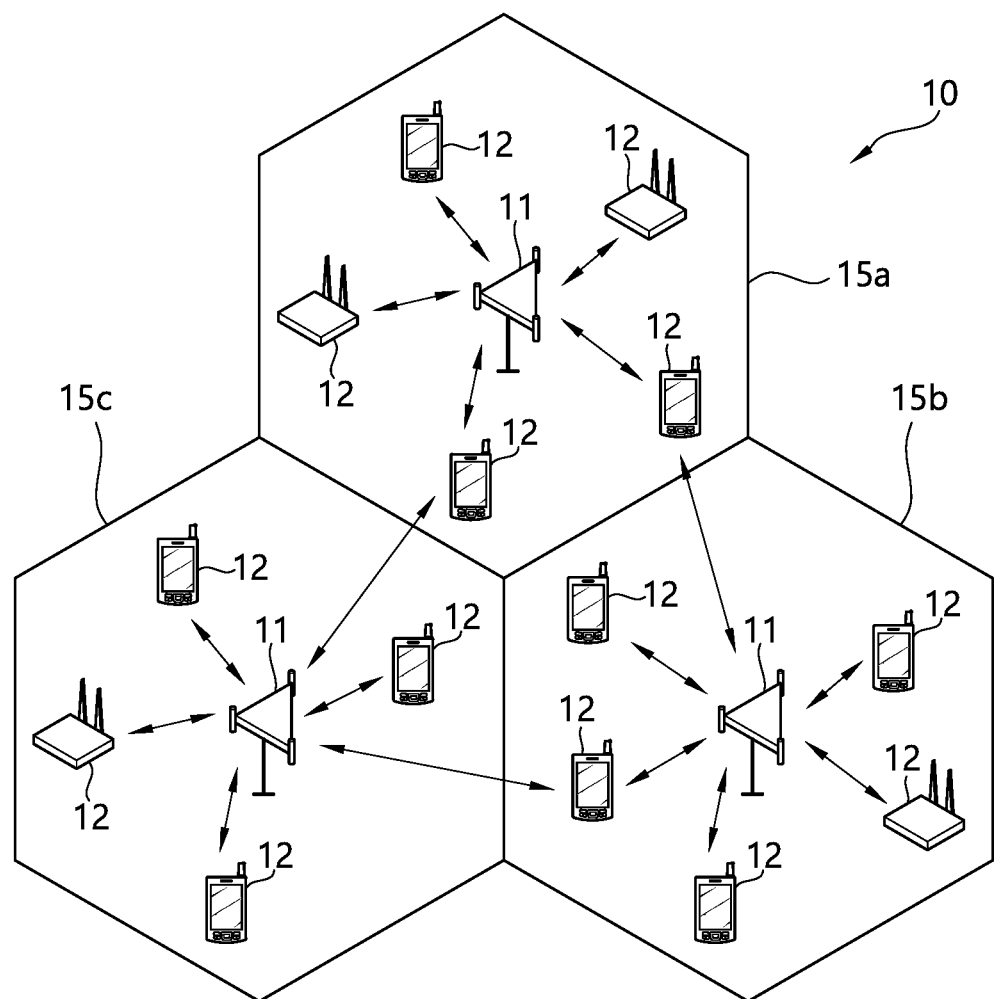
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
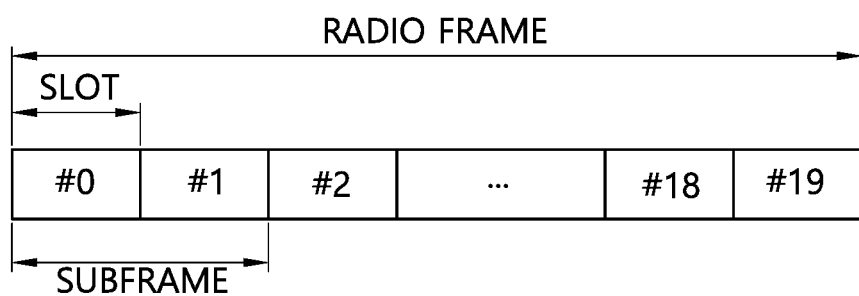
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Cellular internet-of-things (CIoT) is described. Performance objectives of CIoT may include improved indoor coverage, support of massive number of low throughput devices, reduced complexity, improved power efficiency, and latency.

For one of physical layer aspects and radio access protocols for clean slate concepts of CIoT, narrowband M2M (narrowband machine-to-machine) may be considered.

To support massive number of low throughput machine-type communication (MTC) devices (UEs) with a limited number of 200 kHz resource blocks, each resource block is divided into a large number of narrowband physical channels which are individually modulated and pulse-shaped Channelization is done in a frequency division multiplexed (FDM) manner, for both the UL and the DL.

The DL channelization supports efficient frequency re-use, which is important for maintaining overall system capacity, and low complexity equalization at the UE receiver. It also allows separation of traffic for different UE coverage classes onto different physical channels which allows easier optimization of media access control (MAC) characteristics, such as latency, for each coverage class. The UL channelization provides a very efficient means to improve the UL coverage without compromising the UL capacity. The channel spacing in the uplink is a fraction (e.g. ⅓) of that in the DL. This creates many more physical channels in the UL than in the UL. With a significantly higher number of parallel UL data transmissions, the aggregate UL transmit power increases proportionately, and so does the achievable UL capacity. Other techniques such as symbol rate spreading and burst rate repetition may be employed in both the UL and the DL to further extend the coverage.

The duration of a burst may be variable, and a physical channel may be only defined in the frequency domain, not in the time domain (i.e. there is only one physical channel per carrier). Different types of bursts can be carried on a physical channel, depending on the channel type.

The minimum system bandwidth may be a single resource block. Additional resource blocks can be used to increase network capacity, and can have the additional benefit of providing frequency diversity if they are sufficiently separated in frequency. The choice of resource block bandwidth may allow the system to be deployed by re-farming one or more carriers. However, other deployment options may also be available, such as deploying the system stand-alone in any suitable fragment of spectrum, or potentially within the guard-bands of another system.

The base station may operate in radio frequency (RF) full duplex mode in order to maximize network capacity. MTC devices may operate in half duplex mode to reduce the RF cost.

As described above, to minimize the hardware requirement/cost and battery power of a UE in CIoT, small bandwidth such as 200 kHz devices may be considered. For a new device, a new frame structure and new data scheduling mechanisms may be considered. Mainly, the following two aspects may be considered.

(1) A long duration TTI may be specified. While 1 ms TTI is defined in current LTE, a long TTI such as 10 ms TTI may be defined for a new low complexity UE.

(2) A minimum number of channels/designs may be supported. For example, one channel with different content may be used for different purpose. For example, data channel such as physical downlink shared channel (PDSCH) may be used to transmit data and control information.

In terms of cell association, further simplification may be considered. For example, short broadcast may be transmitted without explicit cell association. Also, measurement requirement may be further relaxed or removed to minimize power consumption. In terms of waveform design, waveform used for GSM, high speed packet access (HSPA) or LTE may be reused or tailored mainly for a long TTI and/or small bandwidth. The characteristics of a new system may be the main UE requirement in terms of bandwidth and/or data rate and/or operating signal to interference and noise ratio (SINR) range.

Figure 3:
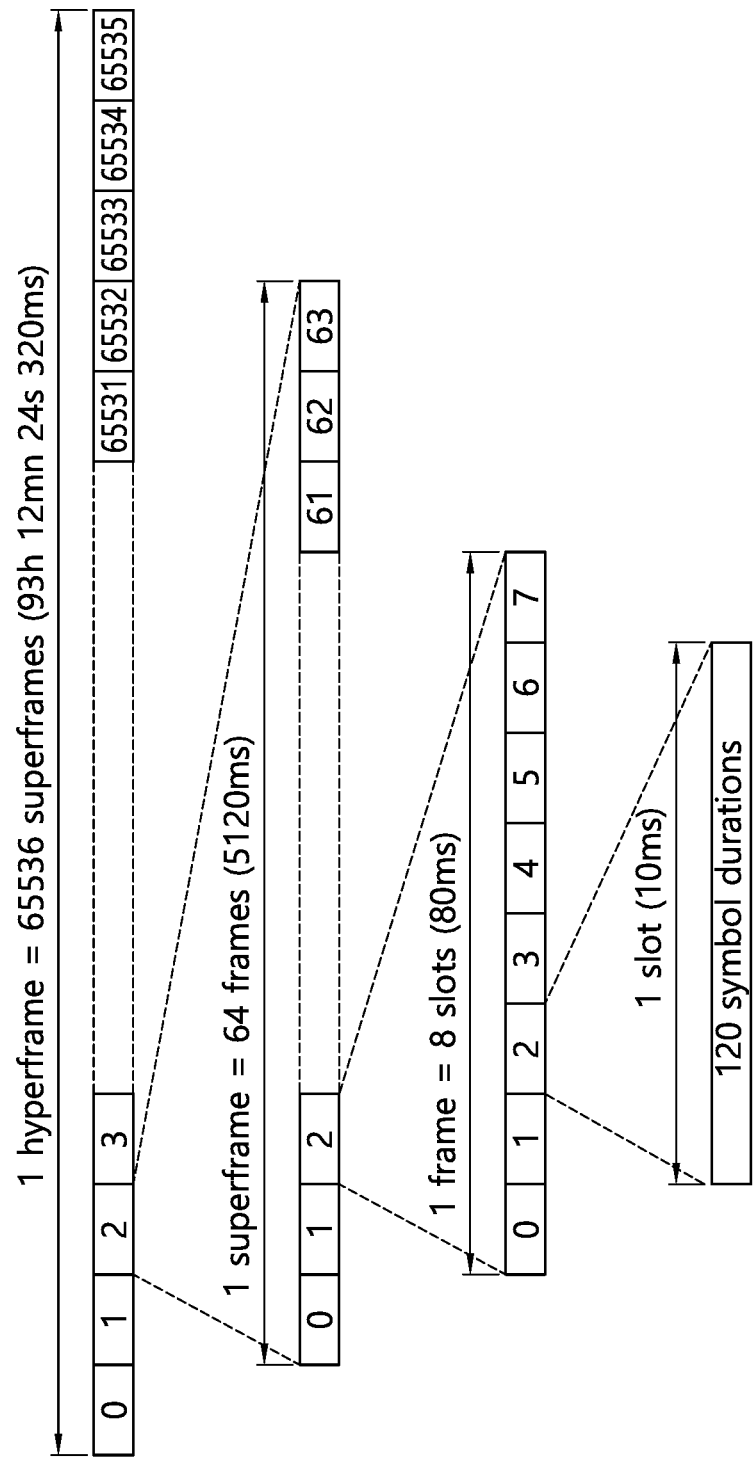
FIG. 3 shows an example of a DL time structure with a long TTI for CIoT.

FIG. 3 shows an example of a DL time structure with a long TTI for CIoT. Referring to FIG. 3, the longest recurrent time period of the time structure is called a hyperframe and has a duration of 335544320 ms (or 93 h 12 mn 24 s 320 ms). One hyperframe is subdivided into 65536 superframes which each have a duration of 5120 ms. Superframes are numbered modulo this hyperframe (superframe number, or system frame number (SFN), from 0 to 65535). One superframe is subdivided into 64 frames which each have a duration of 80 ms. Frames are numbered modulo this superframe (frame number, or FN, from 0 to 63). A frame is the time unit for transmission of the broadcast signal and synchronization information on physical broadcast and synchronization channel (PBSCH). One frame is also the minimum interval between transmissions of successive downlink control information (DCI) bursts on PDSCH. One frame comprises eight slots which are numbered modulo this frame (slot number, or SN, from 0 to 7). One slot lasts 10 ms and is the minimum scheduling unit on PDSCH. The eight slots in one frame belong to the same physical channel.

Hereinafter, various enhancements of CIoT enhancement according to various embodiments of the present invention are described.

(1) Design Principle of Narrowband Machine-to-Machine (NB M2M) for CIoT

NB M2M is optimized for IoT communications, taking account of the compatibility with stand-alone deployments in a low minimum system bandwidth in order to support a variety of deployment options, including, specifically, re-farming GSM carriers. For example, for deployment options, one of GSM carrier, LTE guard band (when lower power is used), or LTE carrier may be considered.

Further, for deployment options of CIoT, a single carrier or multiple carriers may be considered. If a UE is configured with multiple carriers where a UE can monitor only one carrier at a time, a UE may be configured with a reference carrier which may be used for time/frequency synchronization. Further, this reference carrier may be used for measuring coverage class and other measurements. In such a case, frequency hopping between carriers may require retuning latency. Thus, when the network asks to the UE to switch carrier of 200 kHz, retuning latency may be considered. When a UE is configured with multiple carriers, DL data transmission may occur across those multiple carriers where frequency hopping across those multiple carriers may also be possible. If frequency hopping occurs, frequency hopping across multiple carriers may be independently performed from frequency hopping within a carrier between subcarriers. In general, though a UE may support only 200 kHz, a UE may be configured with multiple carriers whose bandwidth and frequency range are known to the UE via e.g. system information.

It is also possible that a network may form multiple carriers into a virtual carrier whose system bandwidth is multiple of 200 kHz depending on how many carriers are used for the virtual carrier. The system bandwidth may be configured in system information and only one carrier, possibly in the center, may transmit synchronization signals and system information. In such a case, resource allocation, configuration, and so on, may be based on the virtual system bandwidth rather than based on system bandwidth of a carrier. In other words, though a UE can support only one carrier at a time, the network may form a larger system bandwidth by partitioning the large system bandwidth into a few small subbands with the size of one carrier. A UE may also indicate the bandwidth that the UE can support in case that data scheduling over more than one carrier may be also possible to such UEs.

Figure 4:
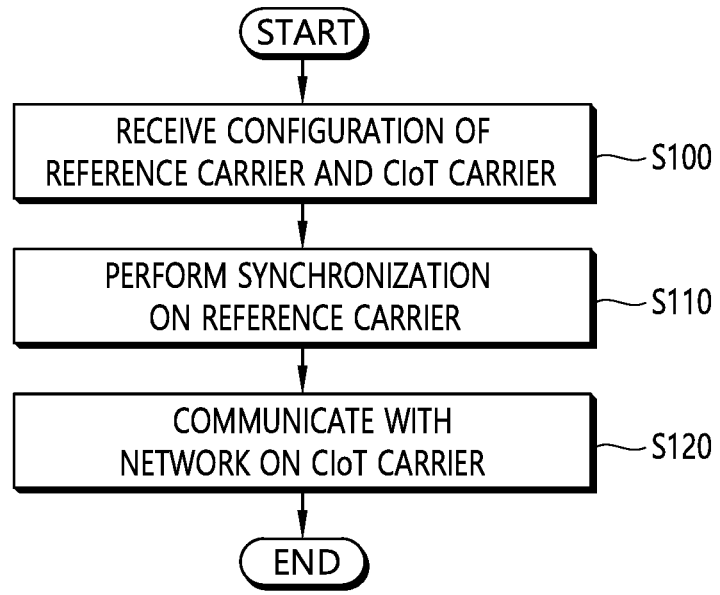
FIG. 4 shows a method for communicating, by a UE, on a CIoT carrier according to an embodiment of the present invention.

FIG. 4 shows a method for communicating, by a UE, on a CIoT carrier according to an embodiment of the present invention.

In step S100, the UE receives a configuration of a reference carrier and the CIoT carrier. In step S110, the UE performs synchronization on the reference carrier. In step S120, the UE communicates with a network on the CIoT carrier. Further, the UE may monitor one of the reference carrier or the CIoT carrier in a specific time. Further, the UE may perform coverage class measurement on the reference carrier. Further, the UE may communicate with the network on the reference carrier. In this case, a frequency hopping between the CIoT carrier and the reference carrier may be applied for communicating with the network.

(2) Channelization for CIoT

Figure 5:
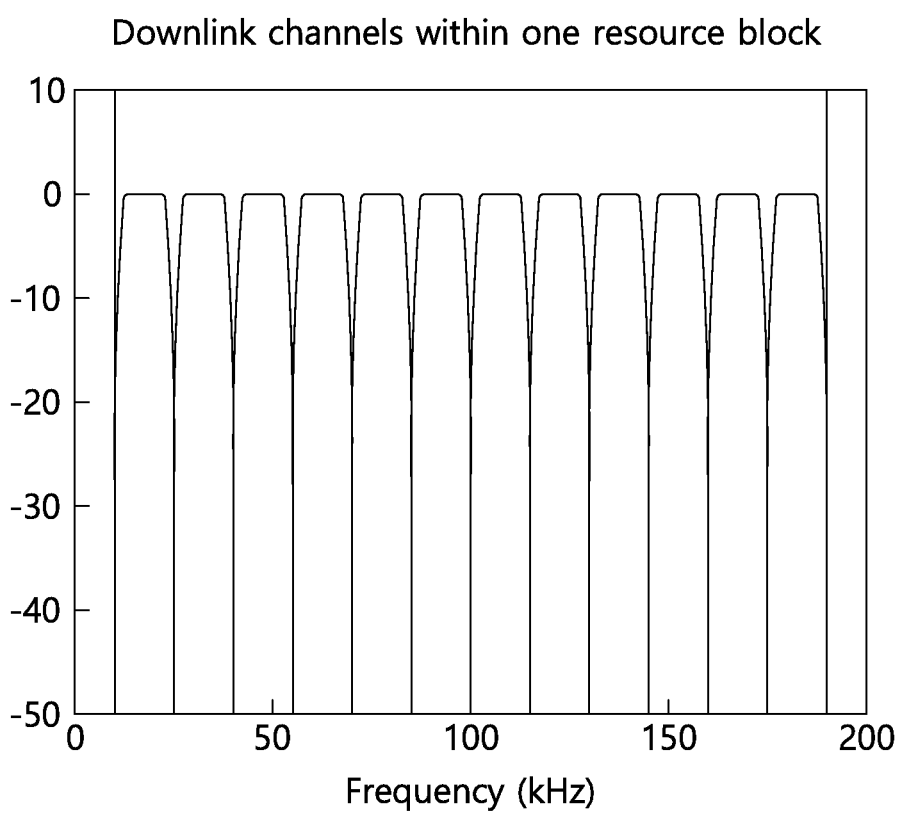
FIG. 5 shows a DL channelization for CIoT according to an embodiment of the present invention.

FIG. 5 shows a DL channelization for CIoT according to an embodiment of the present invention. Referring to FIG. 5, for DL, it may be proposed that the 200 kHz resource block is sub-divided into multiple DL physical channels, for example 12 channels, which occupy a total of 180 kHz, plus a 10 kHz guard band at each edge. In this case, the physical channels may be numbered DL_CHAN=0 to 11, with DL_CHAN=0 representing the lowest frequency channel. The center frequency, $F_{DL}(DL\_CHAN)$, of each physical channel relative to the lowest frequency of the resource block may be given by $F_{DL}(DL\_CHAN)=(DL\_CHAN+0.5)\times 15+10$ kHz.

Figure 6:
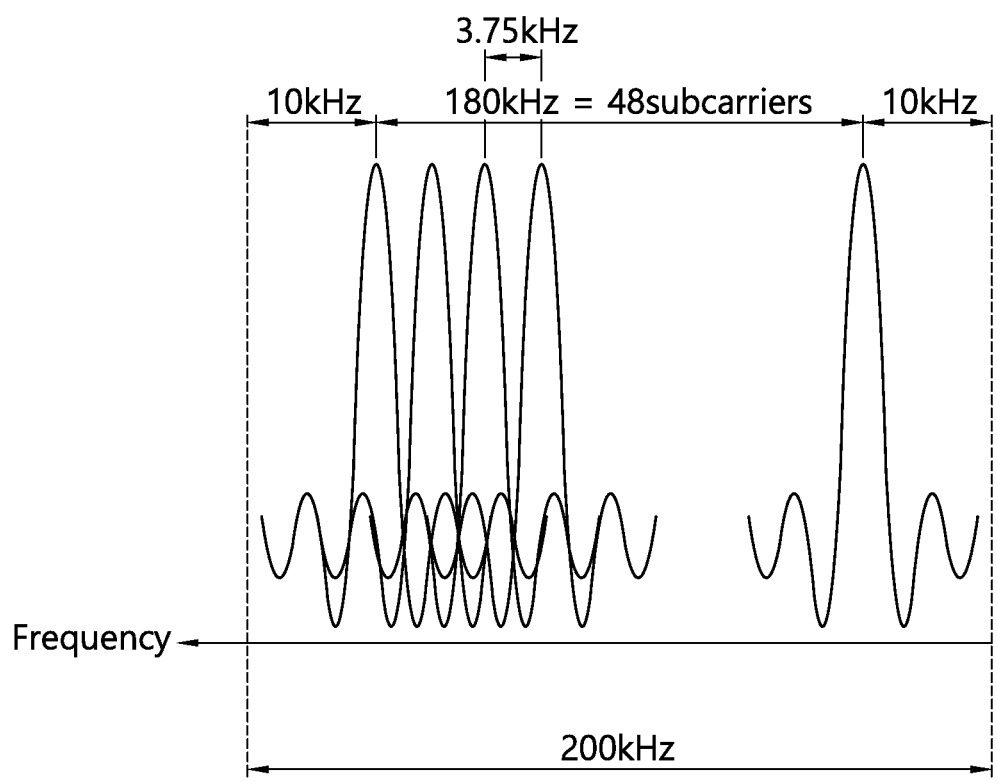
FIG. 6 shows another DL channelization for CIoT according to an embodiment of the present invention.

FIG. 6 shows another DL channelization for CIoT according to an embodiment of the present invention. This embodiment may consider OFDMA used for DL. Referring to FIG. 6, the 200 kHz resource block is sub-divided into multiple 48 subcarriers, which occupy a total of 180 kHz, plus a 10 kHz guard band at each edge. In this case, each subcarrier may be indexed from 0 to 47 where the center frequency location of each subcarrier is $F_{DL}(DL\_SC)=(DL\_SC+0.5)\times 3.75+10$ kHz.

There may be three types of DL physical channels, which includes the physical broadcast and synchronization channel (PBSCH) that carries synchronization signal and basic broadcast information (information block 1), the extended physical broadcast channel (EPBCH) that carries extended broadcast information (broadcast information blocks 2, 3 and 4), and the PDSCH that carries data, control information, paging, and signalling, etc. A change in the extended broadcast information may be indicated in the basic broadcast information. This minimizes the average time taken by a UE to access the broadcast information.

Further, following DL physical channels and/or signals may be defined.

Primary synchronization signals (PSS): PSS may be mainly used for time/frequency acquisition Secondary synchronization signals (SSS): SSS may be mainly used for frame timing and cell identifier (ID) detection Physical broadcast channel (PBCH): PBCH may be used for network and cell specific configuration information Physical downlink control channel (PDCCH): PDCCH may be used for paging, random access channel (RACH) response, DL/UL assignment, acknowledgement (ACK) to physical uplink shared channel (PUSCH), and/or power control. The same format of PDSCH may be used where only the payload is different between PDCCH and PDSCH. PDCCH may be differentiated from PDSCH as it will be transmitted in a set of candidate locations where PDCCH for a UE may or may not be present (i.e. UE blindly decoding PDCCH). However, if special DCI carried over PDCCH is used to indicate length or the number of DCIs in PDCCH and also the DCI indication, a UE may assume that those DCI are always present regardless of the number of DCI scheduled.

PDSCH: PDSCH may be used for traffic.

(3) Modulation and Coding Scheme (MCS) for CIoT

Table 1 shows MCS for PDSCH.

TABLE 1

| DL MCS index | Modulation | Code rate | Spreading factor | Repetition factor | PHY data rate (kbps) |
|---|---|---|---|---|---|
| 0 | π/2-BPSK | 1/2 | 4 | 8 | 0.135 |
| 1 | π/2-BPSK | 1/2 | 4 | 4 | 0.27 |
| 2 | π/2-BPSK | 1/2 | 4 | 2 | 0.54 |
| 3 | π/2-BPSK | 1/2 | 4 | 1 | 1.08 |
| 4 | π/2-BPSK | 1/2 | 2 | 1 | 2.16 |
| 5 | π/2-BPSK | 1/2 | 1 | 1 | 4.32 |
| 6 | π/4-QPSK | 1/2 | 1 | 1 | 8.64 |
| 7 | π/4-QPSK | 3/4 | 1 | 1 | 12.96 |
| 8 | 16-QAM | 1/2 | 1 | 1 | 17.28 |
| 9 | 16-QAM | 3/4 | 1 | 1 | 25.92 |

Referring to Table 1, a total of 10 MCS indexes are supported for the PDSCH, providing PHY data rates ranging from 135 bps to 25.92 kbps. The quoted data rates may take into account pilot overheads and may also be scaled by 0.9 to allow for retransmissions arising from a 10% block error rate.

However, the bit error rate (BER) target for control channel may be 0.01 rather than 0.1 to minimize the loss of control channel. It means that either code rate or MCS may be determined to meet the desired target. If any feedback is needed, a UE may compute MCS targeting BER=0.01, which means that different channel state information (CSI) for control channel may be used from CSI for data channel. Further, additional CSI for data channel may not be reported, as the network may compute the desired MCS to meet BER of 0.1. Furthermore, to minimize the retransmission overhead and reduce the power consumption, BER target for retransmission may be enhanced. For example, if MCS index 4 is used for initial transmission, MCS index 0 may be used for retransmission which offers lower code rate and better reliability.

Alternatively, soft combining or hybrid automatic repeat request (HARQ) combining may be used. For an example, redundancy version in each PDSCH transmission may be used. Alternatively, redundancy version=0 may always be used where redundancy version is not needed in DCI. To minimize DCI overhead, depending on coverage class, redundancy version may or may not be used in DCI. For example, coverage class 0/1 may use redundancy version in DCI, whereas coverage class 2-4 may not use redundancy version in DCI. It can be predefined such that depending on the coverage class, the UE knows the exact field/size of DCI format.

Spreading and repetitions may be applied for the lower MCS indexes to achieve various coverage extension levels. DL MCS-0 may be designed to target a minimum coupling loss (MCL) even higher than the 164 dB required by the CIoT. This may assure robustness of the system against interference and may also provide some further coverage extension capability.

Further, if one control channel contains only one DCI, the size of DCI may be fixed, and the MCS value may also be also fixed. The MCS and/or burst length used for each DCI may be signalled from system information.

(4) UL Synchronization for CIoT

The start timing of each UL transmission from the UE may be aligned to the estimated timing of the DL synchronization signals in PBSCH (PSS/SSS) and may also be refined based on the estimated timing of the preamble and pilot symbols in subsequent PDSCH bursts. A guard period may be inserted, if needed, at one end of each UL burst in order to avoid potential for a collision with a previous burst from a different UE on the same physical UL sub-channel, even with a worst case difference in round trip delay between the two UEs.

Alternatively, the network may configure timing advance (TA), which may not be so accurate as the UE may lose time synchronization or the UE changes its location. Based on a rough TA which may be semi-statically configured, the necessary total guard period may be reduced.

The UL time of arrival (ToA) for a given UE may be initially estimated by the BS receiver using the pilot symbols contained in the UL burst corresponding to the random access request from the device. Tracking of the UL ToA may be performed based on subsequent UL transmissions from the device, using the pilot symbols in each burst. The estimated ToA may be used by the BS receiver for the demodulation of the uplink burst. To allow efficient measurement of ToA, it may be considered to have a preamble transmitted before or at the first of PRACH transmission. Considering a PUSCH/PRACH transmission which may go over more than 1 slot duration, a starting position or slot index or periodicity of possible location of UL transmission may be further considered. In other words, the starting location of PRACH may be aligned by at least one of the following options.

Option 1: If one or continuous UL carriers are configured for PRACH resource, a UE may initiate PRACH any time aligned with slot boundary.

Option 2: PRACH resource may be defined with periodicity, duration per each UL carrier, where one or continuous UL carriers are configured for PRACH resource. More specifically, duration may be omitted as the duration may different per coverage class. Alternatively, duration may be used as possible PRACH resource where a UE may start PRACH transmission in any slot during the duration.

Option 3: PRACH transmission may be attempted aligned with frame boundary or m slots boundary.

(5) UE Operating Modes for CIoT

Figure 7:
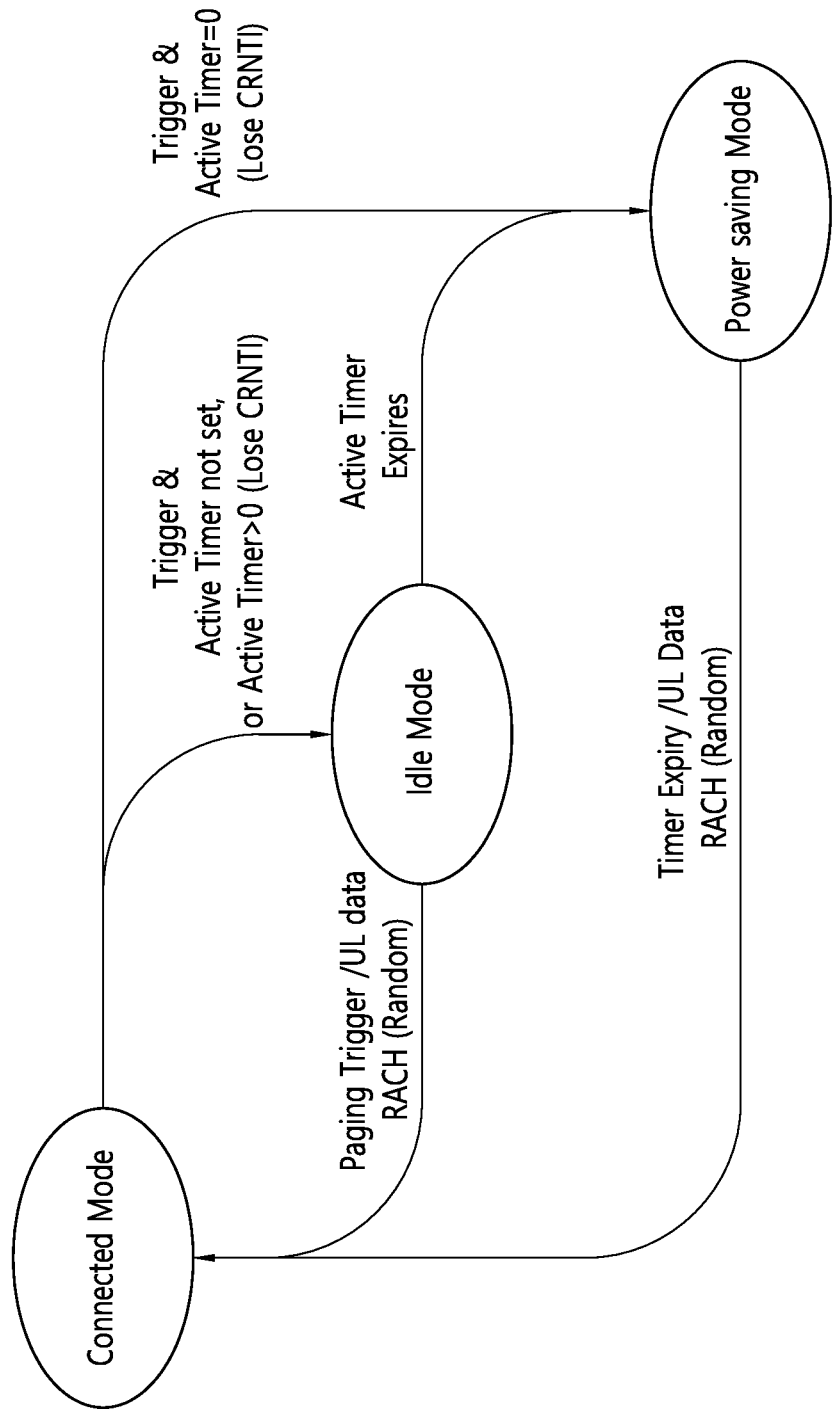
FIG. 7 shows an example of UE operating modes according to an embodiment of the present invention.

FIG. 7 shows an example of UE operating modes according to an embodiment of the present invention. A NB M2M UE may operate in one of three modes, a connected mode or two different sleep modes, which includes an idle mode and a power saving mode (PSM). In connected mode, the UE is receiving DCIs and allocations, MAC control elements (CE), non-access stratum (NAS) signaling and data are being transferred over the air interface. The UE may be configured to transition to either idle mode or power saving mode from connected mode. The choice of mode may be determined by whether active Timer has been set and its value. In idle mode, the UE may be reached from the network and the BS may trigger the UE to move back to connected mode. The UE may also transition from idle mode to power saving mode if the active timer is running and expires. In power saving mode, the UE may be unreachable from the network. The network may need to wait for the UE to wake and contact the BS. In all the modes, the UE may perform RACH to connect and request resource. UEs in connected mode may be addressed by the BS though their cell radio network temporary identity (C-RNTI). When a UE is in idle mode, it may only be addressed via paging procedure, and when a UE is in power saving mode, it may not be addressed.

Further, one more state, i.e. DRX state, may be further considered. In DRX state, a UE may transmit PRACH once it wakes up from DRX. For example, a UE may wake up from DRX and initiate PRACH to transmit any UL transmission. For this RACH procedure, a dedicated PRACH resource may also be considered. One reason to send this PRACH is to inform the coverage class of the UE based on the measurement when it wakes up. If the coverage class has not been changed, a UE may not initiate RACH. Otherwise, i.e. the coverage class has been changed, the UE may initiate PRACH. Different from the current DRX procedure in LTE, a UE may transmit PRACH with coverage class information, and if the network has not responded, the UE may go back to sleep. Alternatively, the network may transmit DCI and a UE may go back to sleep once it does not detect any DCI scheduled to itself during T ms duration. The duration of T may be configured per coverage level or may be a function or determined based on the DRX cycle. For example, T may be always ceil (DRX_CYCLE*0.01) ms. Or, T may be a number of DCI intervals or DCI monitoring occasions that a UE should perform. For example, T may be two where a UE shall monitor at least two DCI monitoring occasions before it can go back to sleep. It is also possible that T may be UE-configured.

For another approach to indicate change of coverage class, the UE may trigger PRACH to the network to initiate coverage class update. In this case, the UE may trigger PRACH to the network when DCI indicator (DI), which indicates whether a UE may have a data/scheduling information or not, is used, or when DI is flagged for its group or common data scheduling(s), or when the UE is not able to decode successfully on the resource allocated for itself and/or the UE is not able to decode common data scheduling. Since it is important to check whether the UE has any data while it was sleeping, if there is indication to its group, a UE may initiate PRACH to see whether coverage class needs to be updated, if the UE is not sure whether the network has properly configured the coverage class.

For coverage class measurement, reference signal (RS) carried for master information and/or system information along with PSS/SSS may be used. Similar to radio link management (RLM), the quality of control channel may be measured, e.g. based on a common data transmission and/or DI indication. For example, a UE may read periodically DCI carrying DI (and other information possibly) and/or common data scheduling in different coverage class. Mainly, it is for whether it can reduce its coverage class. When the UE succeeds reading on common data and/or common DCI in different coverage class, the UE may trigger PRACH to reduce its coverage class. Since it may require UE power consumption, and so on, this action including measurement may be triggered only when a UE detects SINR on the received data and/or control channel exceeding a certain threshold or has been noticed that SINR range has been greatly improved based on its current control/data reception. In other words, unless triggered by higher layer or by itself, a UE may perform measurement on SINR or BER of its control/data channels received only, and its measurement may trigger possibility of improved coverage. The UE may read other coverage class information to determine whether the uE can switch to better coverage class.

Another approach to handle possible coverage class change may be that a UE may fall back to the maximum coverage class whenever its DRX cycle is longer than "X" (e.g. X=30 minutes). In other words, the network may schedule control signal and possibly data to the maximum coverage class assuming coverage class may have been changed. When the UE transmits any signal/data, the UE may report its current coverage class, and the network may adjust coverage class of the UE based on the UL transmission. The similar procedure applies to UE switched from idle mode to connected mode or UE switched from PSM to connected mode. In terms of UE switched from PSM to idle mode, it may affect the coverage class of paging. To be safe, worst coverage class for UEs switched from PSM to idle mode may be assumed. To determine whether a UE is in PSM, the UE may inform the network upon entering PSM, and then, the network may set coverage class of the UE to the maximum coverage class.

To summarize the above description for handling change of coverage class, the following approaches may be proposed.

It may be assumed that coverage class of the UE is constant. The UE may use timer to detect the incorrect coverage class.

PRACH may be transmitted whenever the UE wakes up, at least for UEs with DRX cycle longer than "X"

PRACH may be transmitted only when the UE is not able to successfully decode common data in the currently used coverage class. In this case, the UE may switch to different coverage class and attempt to read the common data to see whether change of coverage class can address its issue.

PRACH may be transmitted to indicate coverage class if the UE is not able to decode a common DCI carrying paging message indicator (PMI) or DI.

PRACH may be transmitted based on the measurement, and the UE may detect coverage class change. This measurement may be based on PSS/SSS and PBCHs.

The UE may fall back to the maximum coverage class for a UE with long DRX cycle or a UE in idle mode or UE in PSM. The UE may transmit PRACH or UL transmission to inform the coverage class.

Further, C-RNTI may expire after some inactive time such that a UE may have to perform PRACH to acquire C-RNTI which may be used for control/data transmission. Even if C-RNTI is not used, the above mechanism still may be used. In terms of determining coverage class for paging, similar approach, e.g. PRACH may be transmitted to indicate coverage class if the UE is not able to decode a common DCI carrying PMI or DI, may be used. Depending on whether it has a valid C-RNTI or not, RACH procedure and/or used RNTI may be different.

Figure 8:
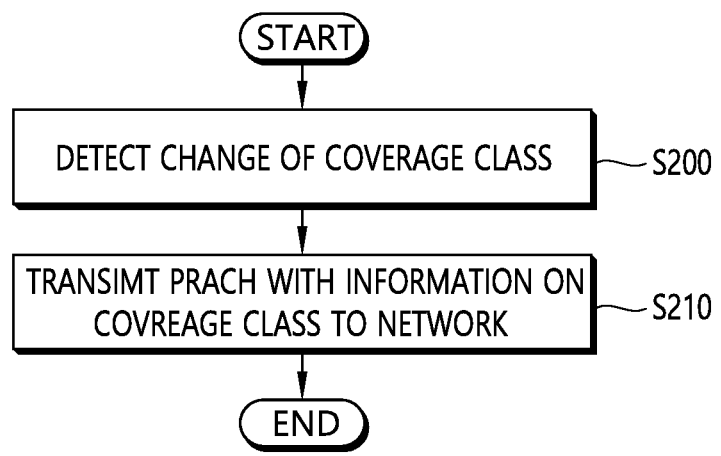
FIG. 8 shows a method for transmitting, by a UE, a PRACH for CIoT according to an embodiment of the present invention.

FIG. 8 shows a method for transmitting, by a UE, a PRACH for CIoT according to an embodiment of the present invention.

In step S200, the UE detects change of coverage class. The UE may be in a DRX state for CIoT.

In step S210, the UE transmits the PRACH with information on the coverage class to a network. The PRACH may be transmitted upon waking up from a DRX in the DRX state. The PRACH may be transmitted via a dedicated PRACH resource configured by the network.

If the network has not responded to the PRACH, the UE may switch to a sleep mode. Alternatively, the UE may detect DCI during a specific duration. If any DCI is not detected during the specific duration, the UE may switch to a sleep mode.

(6) Random Access Procedure with Random Number for CIoT

When the UE is not connected to the BS, the UE may initiate a random access procedure with random number. This procedure establishes a radio connection between the UE and the BS, and assigns a connection identifier C-RNTI to be used for the transfer of data between the UE and the BS.

Figure 9:
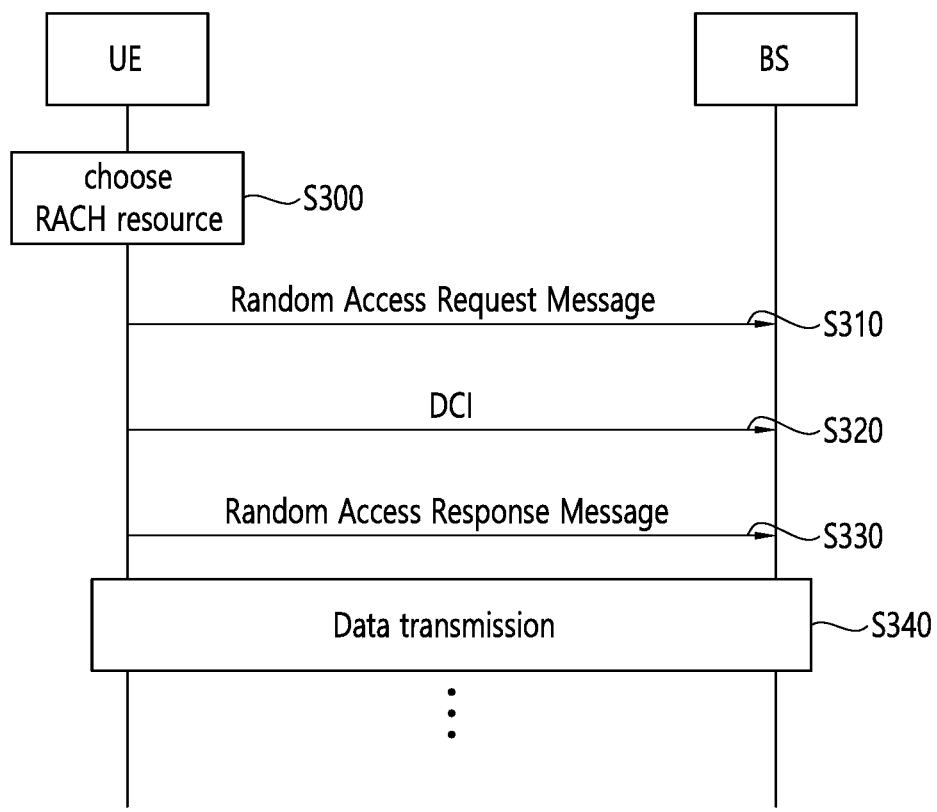
FIG. 9 shows a random access procedure with random number according to an embodiment of the present invention.

FIG. 9 shows a random access procedure with random number according to an embodiment of the present invention.

In step S300, the UE chooses a coverage class and RACH resource. Based on the received signal quality of the PBSCH, the UE may be able to decide which coverage class and RACH resource to use.

In step S310, the UE transmits a random access request message. The UE may select a random number (e.g. 20 bits), which is transmitted in the random access request message and is used to resolve contention in a "one phase" procedure. The access cause and the buffer status report (BSR) may provide information for the BS to schedule the required UL resources for the UE. Alternatively, its own ID may be used for PRACH. For example, STSIM may be used for PRACH transmission.

In step S320, the BS schedules a RACH response allocation. After receiving the random access request message, the BS uses a DCI to schedule a DL radio resource allocation for the random access RNTI (RA-RNTI). This DL resource may be used for the transmission of the random access response message. There is a one-to-one mapping between the RA-RNTI value and the physical channel used for the RACH resource. Therefore, all UEs transmitting a random access request message in the same physical channel may use the same RA-RNTI value. The BS may also include a radio resource allocation for the assigned C-RNTI within the same DCI.

Alternatively, RA-RNTI may be determined based on physical channel used for RACH resource (if multiple physical channels are used, e.g. via UL bonding, the first resource is used) and also starting slot or SFN index where PRACH transmission has occurred. This is to avoid or differentiate random access response between two UEs which starts in different timing using the same frequency resource where RAR has been transmitted in similar time.

In step S330, the UE receives the random access response message. The random access response message may assign C-RNTI values to the UEs. The random access response message may contain a list of random numbers from the random access request messages transmitted by the UEs and a C-RNTI value for each random number. The random access response may also include a start indicator with each C-RNTI assignment that identifies the RACH allocation the request was received in. The start indicator may have the same meaning as in RACH configuration scheduled by DCI or may be calculated by RACH configuration broadcast in system information.

The UE receives the random access response message in the allocation defined in the DCI, locates the start indicator of the RACH resource it used and its random number or used ID/RNTI, and then stores the C-RNTI value associated with its random number. The C-RNTI values may be used by the BS for scheduling UL and DL resources for the UEs. The UE monitors DCIs for allocations associated with the assigned C-RNTI, including the DCI that allocated the random access response message.

If ID is not matched, in other words, RAR is not for the UE, the UE may assume RACH failure, and thus, may attempt retransmission.

If the UE fails to receive RAR, the UE may perform retransmission, possibly with power ramping. It may be assumed that the maximum number of retransmission per each coverage class is either prefixed or preconfigured. Based on the number, if UE reaches the maximum retransmission number, the UE may move to the next coverage class. When it reaches to the last coverage class, a UE may attempt to reselect the cell. Based on the measurement, a UE may be able to switch to different coverage class rather than always move to the next coverage class in case of RAR failure. For example, if PRACH transmission on coverage class 2 has been failed, and the measurement results indicates that coverage class 4 should be used, and then, the UE may switch to coverage class 4 immediately. In other words, since a UE may detect coverage class wrong, when the UE performs RACH procedure, the UE may also increment coverage class.

(7) Data Transfer Procedure for CIoT

The data transfer procedure applies to UEs in connected mode. Connected mode has 2 sub-modes, which includes all DCI reception (ADR), and reduced DCI reception (RDR).

Figure 10:
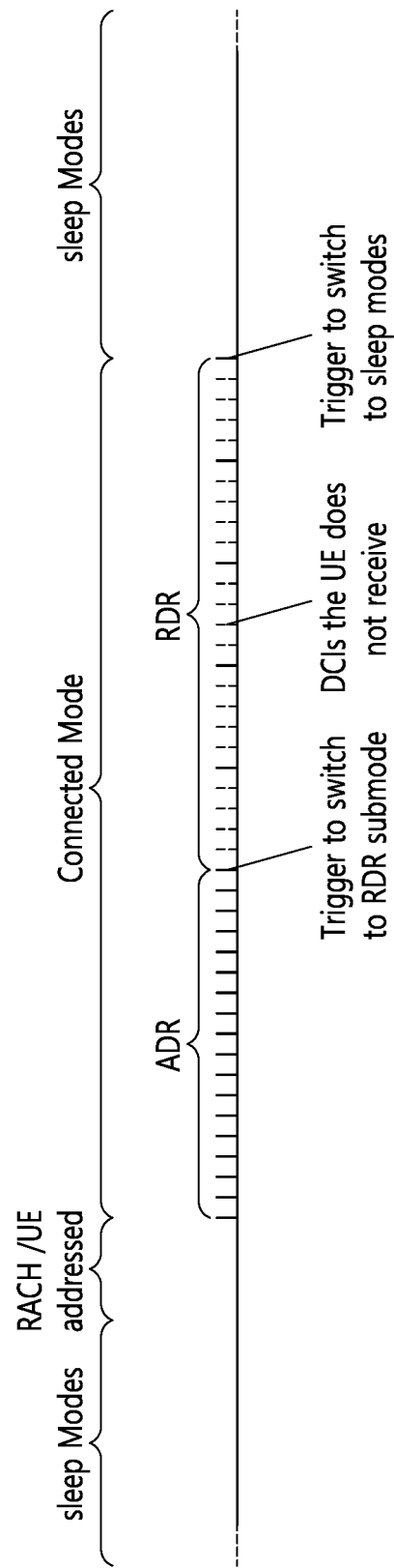
FIG. 10 shows connected mode DCI monitoring according to an embodiment of the present invention.

FIG. 10 shows connected mode DCI monitoring according to an embodiment of the present invention. FIG. 10 shows the relationship between connected mode, sleep modes, and the sub-modes of connected mode.

When the UE enters connected mode, it may use ADR. Once data transfer and signalling is complete, the UE may enter RDR. In RDR, the UE may receive a subset of the DCIs transmitted by the BS. RDR allows the UE to be addressed by the BS, while saving power in the UE, should there be additional data transfer, e.g. application acknowledgements to UL messages.

The successful completion of an UL data transfer may be signalled by the BS via a feedback indication in the DCI following the UL data transmission. The successful completion of a DL data transfer may be signalled by the UE via the transmission of a MAC CE which, in turn, is acknowledged by the BS in the next DCI as per the mechanism used for UL MAC transfer. Thus, the BS acknowledgment of the last UL data transfer may be an unambiguous trigger to enter RDR.

The UE should only enter RDR when there is no more data pending for transfer (UL or DL). The UE may inform the BS when it transmits the last UL data packet. If DL data is pending, the BS should schedule a resource allocation for it.

If the UE is in connected mode and new UL data is to be sent but the BS is not providing scheduled resources for the UE, e.g. because the BS has provided all the resources indicated by the last BSR report from the UE, then the UE may use the RACH with C-RNTI procedure to request additional UL resources.

While in RDR mode, the DCIs which the UE receives may be called anchor DCIs. The anchor DCIs serve a similar purpose to the paging occasions in idle mode, i.e. they define a point in time where the UE can be contacted by the BS. Anchor DCIs may be defined by a RDR cycle (e.g. power of 2 number of frames) and the use of UE specific information (e.g. UE C-RNTI or time of the DCI carrying the feedback information) to prevent all UEs from attempting to use the same DCI as an anchor.

The RDR cycle used in the RDR sub-mode does not have any associated UE specific latency requirements. It may define the frequency of opportunities the BS has for addressing the UEs in connected mode and should be short enough so as not to substantially impact the UE battery consumption (over time) or have an impact on the legacy core network (e.g. NAS retransmission timers), typically in the range of a few seconds. The length of the RDR cycle may be common to all UEs and may be broadcast in the system information. When activity has not taken place for some time, the UE may move from connected mode into one of the sleep modes for better battery savings using a connected mode release timer.

Alternatively, DI may be used instead of two phases. After finishing its UL data transmission, the UE may set inactivity timer where the UE monitors DI-DCI (DCI carrying DI) during the timer. A common data may be scheduled during inactivity timer running. However, the UE may not reset the inactivity timer. Whenever a UE detects scheduling, the UE may reset inactivity timer. When the UE detects DI but no scheduling for inactivity timer, the UE goes to sleep. This is similar to current LTE procedure. Only difference is that the UE monitors DI-DCI instead of scheduling DCIs.

(8) Feedback Mechanism and Processing for CIoT

A single process retransmission may be proposed to reduce the buffer size while guaranteeing the reliability of data transmission. In single process retransmission, a new MAC protocol data unit (PDU) may can be sent only when the previous MAC PDU has been acknowledged. In single process retransmission mechanism, each MAC endpoint transmitter may have an associated send state variable $V(S)$. $V(S)$ denotes the sequence number of the next in-sequence MAC PDU to be transmitted. $V(S)$ may take on the value 0 or 1. The value of $V(S)$ may be incremented by 1 after transmission of the MAC PDU with $V(S)=V(R)$. $V(R)$ is defined below. Each MAC endpoint receiver may have an associated receive state variable $V(R)$. The receive state variable may denote the sequence number of the MAC PDU which is expected by the receiver. $V(R)$ may take on the value 0 or 1, and the value of $V(R)$ may be informed to the transmitter. The value of $V(R)$ may be incremented by 1 after a MAC PDU has been received correctly.

Figure 11:
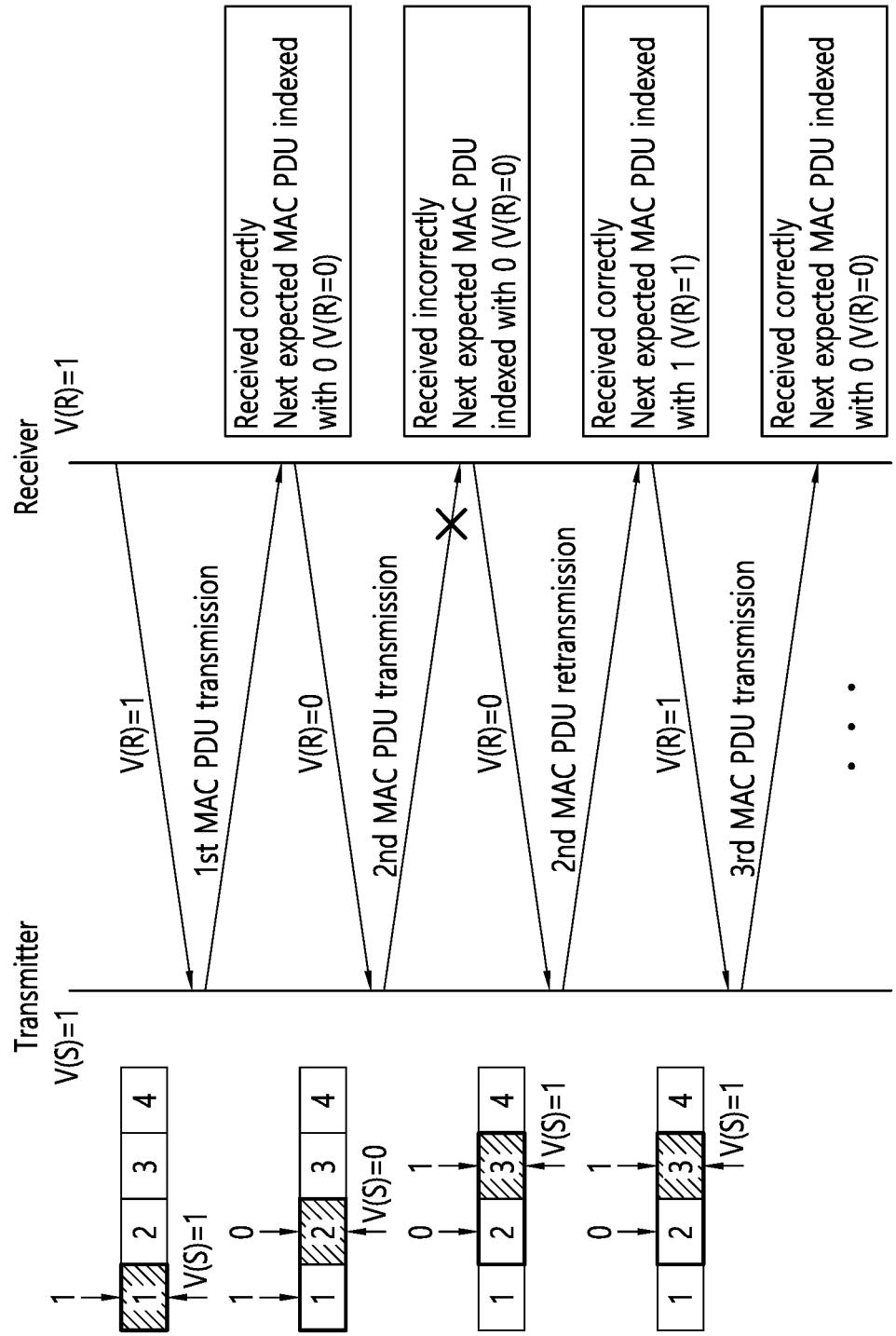
FIG. 11 shows an example of data transmission and retransmission according to an embodiment of the present invention.

FIG. 11 shows an example of data transmission and retransmission according to an embodiment of the present invention. Referring to FIG. 11, since the value of $V(S)$ may either be 0 or 1, the window size of the transmitter may be two. The MAC PDUs in the transmitting window may be indexed as either 0 or 1. The value of $V(S)$ may always be set as the index of the MAC PDU on the right side of the transmitting window. The receiver may inform the expected index of the MAC PDU according to $V(R)$. The transmitter may select the MAC PDU indexed by value of $V(R)$ in the transmitting window to transmit next.

As shown in FIG. 11, when the receiver receives the corresponding signals according to the BS scheduling, the receiver may try to combine the signal with that of the previous transmission if this is a retransmission of the MAC PDU. Then the receiver may demodulate and decode the combined signal. If the MAC PDU is decoded successfully, the receiver may increase the sequence number of $V(R)$ by 1 (for 1-bit $V(R)$, this is equivalent to inverting $V(R)$), and then send the updated $V(R)$ to the transmitter. Otherwise, if the PDU is not decoded successfully, the sequence of $V(R)$ may be kept the same and be sent back to the transmitter.

The transmitter may check the value of $V(R)$ from the feedback information. From the received $V(R)$, the expected MAC PDU from the receiver may be identified by the transmitter. If the received $V(R)$ is different from the $V(S)$ sent in the latest PDU transmission, this means the previous PDU has been decoded successfully by the receiver side. Otherwise, it means a decoding failure by the receiver.

According to the received $V(R)$, the transmitter may choose the expected MAC PDU and the redundancy version to be sent in the next scheduled allocation.

For DL feedback mechanism, after the BS has scheduled a DL allocation, it may need to schedule an UL allocation for the UE to provide feedback. The MS may send the updated $V(R)$ value in the UL MAC PDU. The UE may only be required to provide feedback if there is a change in the $V(R)$ value. The UE may use a MAC CE to provide feedback to the BS. The $V(R)$ value may be carried in the MAC CE.

The UE may fail to receive the DCI which provided the DL allocation, or it may fail to receive the DL MAC PDU. If the UE did not receive the DCI correctly then it will not know when to receive the DL MAC PDU and therefore will not provide feedback in the next UL allocation. If the UE received the DCI, but failed to receive the MAC PDU then it may choose to transmit the current V(R) value in the next UL allocation, indicating a retransmission is required.

When the network does not receive feedbacks for some time, the network may reconfigure the coverage class of the UE. For reconfiguring coverage class of the UE, a fallback mechanism may be applied. For example, a UE may be required to read maximum coverage class control channel at least once per every "T" and the network may schedule RRC message to reconfigure coverage class. Or, the reconfiguration message may be transmitted via common data which may be scheduled per coverage class with sufficient code rate, such that the reconfiguration message may be delivered to UEs with worse coverage. In other words, reconfiguration messages may be transmitted via a DCI of a common message (and data) with lower code rate compared to other DCI and data in the same coverage class.

When the BS schedules an UL allocation after a DL allocation and does not receive a MAC CE carrying the V(R) value then the BS assumes that the UE did not receive the DL transmission successfully and will retransmit the DL MAC PDU. If the UE transmitted a V(R) value then the BS uses the value to determine whether the DL MAC PDU was successfully received or not.

For UL transmission feedback mechanism, the BS may provide V(R) values to the UE using a bitmap ACK field in the DCI that follows an UL allocation. The successful reception of the last UL MAC PDU may be used to trigger entry of RDR from ADR in connected mode, therefore high reliability for the feedback is required. To achieve the high reliability of the feedback, the bitmap ACK field may be repeated in the next DCI.

Figure 12:
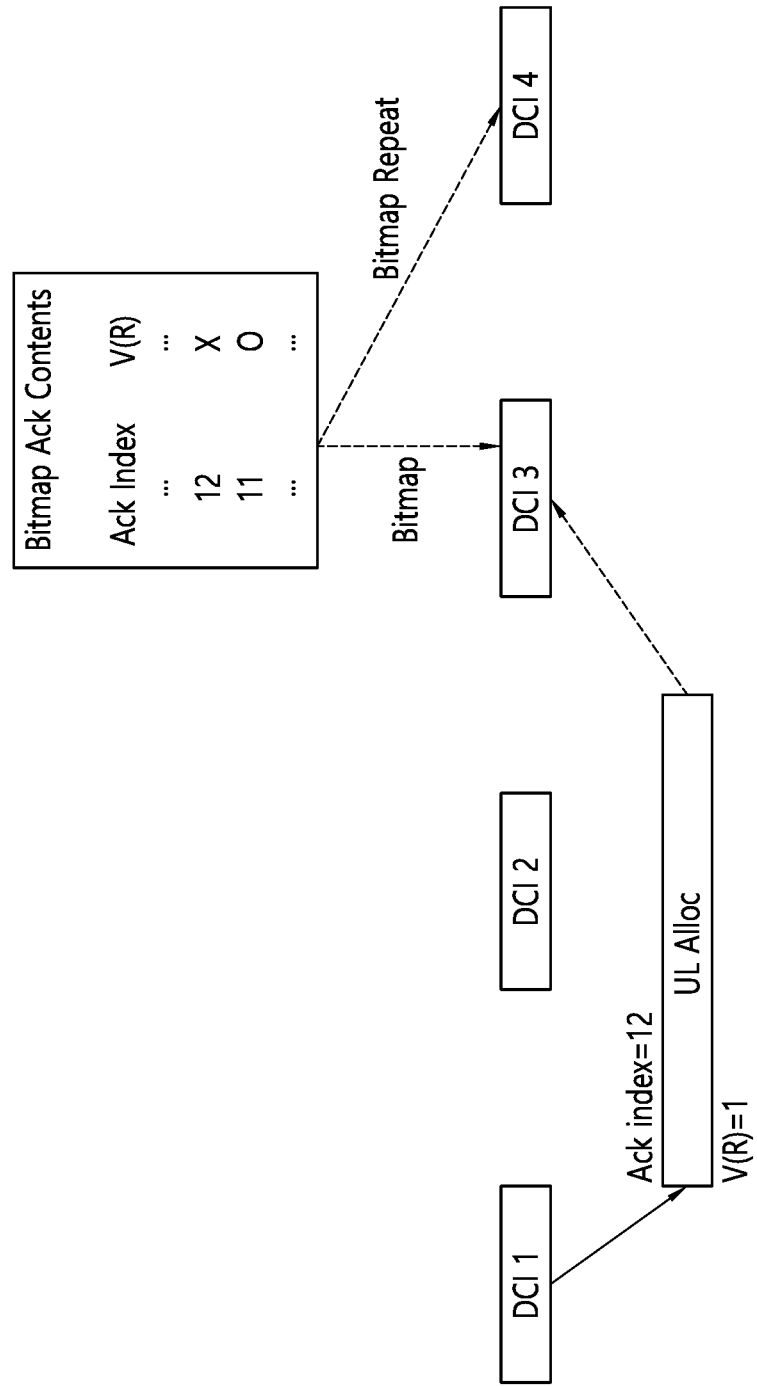
FIG. 12 shows UL transmission acknowledgement scheme according to an embodiment of the present invention.

FIG. 12 shows UL transmission acknowledgement scheme according to an embodiment of the present invention. Referring to FIG. 12, the UL allocation field in a DCI, in addition to the channel, timing, MCS and duration information, may provide an index that indicates the position of the ACK/NACK in the bitmap ACK field of the DCI after the transmission of UL MAC PDU. The bitmap ACK field may be repeated in the next DCI. The bitmap ACK index may be used by the UE to locate the V(R) value for the next UL transmission. If the BS requests the transmission of the next MAC PDU, the UE may discard the previous MAC PDU, freeing buffer space. When the BS indicated successful reception of the last UL MAC PDU, the UE may enter RDR.

Table 2 defines the actions taken by the UE and the BS, depending upon which DCIs the UE has received, whether the last UL MAC PDU has been transmitted and whether the bitmap ACK field indicates successful reception of the UL MAC PDU.

TABLE 2

| Last UL MAC PDU transmitted | DCIs received after UL transmission | ACK or NACK of UL transmission | Action |
|---|---|---|---|
| Yes | First or second DCI received successfully | ACK | Enter RDR. If feedback is received in the first DCI the UE does not need to receive the second DCI. |
| No | First or second DCI received successfully | ACK or NACK | The UE stays in ADR as the last UL MAC PDU has not been transmitted and keeps receiving DCIs for subsequent allocations for UL transmissions |
| Yes or No | First or second DCI received successfully | NACK | The UE stays in ADR and keeps receiving DCIs for subsequent allocations for retransmission. |
| No | None | Unknown by the UE | The UE stays in ADR as the last UL MAC PDU has not been transmitted and keeps receiving DCIs for subsequent allocations for new UL transmissions or retransmissions. If the BS successfully received the UL MAC PDU it will provide further allocations until the last MAC PDU is received. If the BS failed to receive the UL MAC PDU then it will provide an uplink allocation for retransmission. The V(R) value included in the uplink allocation indicated whether the UE retransmits the previous UL MAC PDU or transmits the next UL MAC PDU. The probability of failure to successfully receive 2 consecutive DCIs is low, therefore this is unlikely to occur. |
| Yes | None | Unknown by the UE | The UE uses RACH to request retransmission of the MAC PDU as the UE does not know whether the BS transmitted an ACK or not. The BS will not provide any subsequent allocations as it expects the UE to be in RDR if it transmitted an ACK. When the BS provides the UL allocation the V(R) value will indicate whether the UE should retransmit the previous MAC PDU or transmit a new MAC PDU, therefore the UE and BS are kept synchronized. |

TABLE 2-continued

| Last UL MAC PDU transmitted | DCIs received after UL transmission | ACK or NACK of UL transmission | Action |
|---|---|---|---|
| | | | The probability of failure to successfully receive 2 consecutive DCIs is low, therefore this is unlikely to occur. |

Further, to minimize DCI overhead, another approach of indicating V(R) or ACK/NAKC per UL channel may be considered. For example, all UL channels may be grouped (e.g. 8 groups) where a UE is looking for ACK/NACK information on i-th bit of the bitmap. In this case, i is the group containing the first UL transmission channel (if multiple channels/subcarriers are used). In case frequency hopping is used, virtual index may be used to determine the group. Another approach is to use ACK/NACK indicator (ANI) in addition to this group to differentiate UEs scheduled in resources belonging to the same group in DCI whose size is small such as 2 bits. One of the group formation may be used to divide the total number of channels/subcarriers in to M groups. For example, if 48 subcarriers are present, and M=8, each 6 consecutive channels forms a group. Repetition may be performed in the same slot or same instance of transmission. One example of sending ACK/NACK is to send this along with DI. In other words, ACK/NACK may be included in DI-DCI or a DCI scheduling a common data. Since the group size and ARI is deterministic, total of M*K bits of ACK/NACK may be included in DI-DCI where K is the number of states that ARI can represent (e.g. K=4). This way allows a UE to read only AC/NACK without reading any control channel.

(9) DL Hopping Scheme

PUCCH type 1 hopping of LTE may be used such that hopping occurs with offset in each slot. However, hopping may not occur in slot used for PSS/SSS and/or system information. Thus, those subframes may not be used for hopping. Another approach is to set hopping duration "H" which is a cell specific value. Another example is to pair two channel/subcarriers where hopping occurs, e.g. via mirroring where the hopping duration H may be defined per coverage class.

Figure 13:
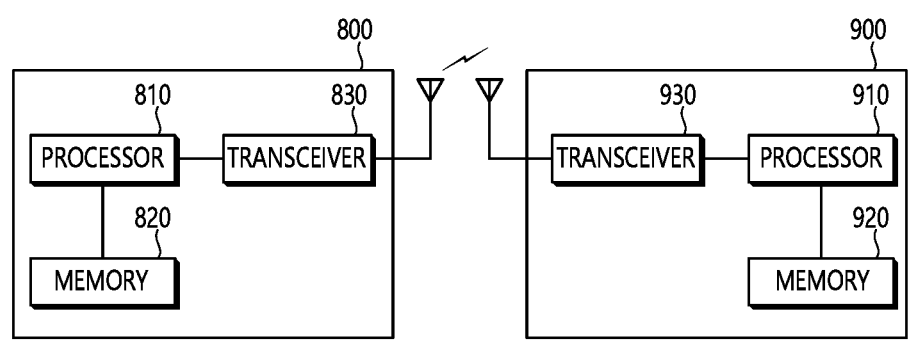
FIG. 13 shows a wireless communication system to implement an embodiment of the present invention.

FIG. 13 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising
receiving a configuration for multiple carriers including a reference carrier, wherein the multiple carriers are configured for a cellular internet-of-things (CIoT);
measuring a coverage class of the reference carrier;
performing synchronization on the reference carrier; and
communicating with a network by frequency hopping across the multiple carriers, wherein the frequency hopping includes retuning a latency based on the measured coverage class.

2. The method of claim 1, further comprising monitoring one of the multiple carriers in a specific time.

3. The method of claim 1, further comprising communicating with the network on the reference carrier.

* * * * *